United States Patent
Gaier

(10) Patent No.: US 11,674,853 B2
(45) Date of Patent: Jun. 13, 2023

(54) SYSTEM, COMPRISING A METALLIC BODY AND A SENSOR DEVICE HAVING AN OPTIMIZED ANTENNA UNIT

(71) Applicant: Robert Bosch GmbH, Stuttgart (DE)

(72) Inventor: Stefan Gaier, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 446 days.

(21) Appl. No.: 16/645,881

(22) PCT Filed: Aug. 16, 2018

(86) PCT No.: PCT/EP2018/072279
§ 371 (c)(1),
(2) Date: Mar. 10, 2020

(87) PCT Pub. No.: WO2019/052771
PCT Pub. Date: Mar. 21, 2019

(65) Prior Publication Data
US 2020/0278259 A1 Sep. 3, 2020

(30) Foreign Application Priority Data
Sep. 12, 2017 (DE) .......................... 102017216043.8

(51) Int. Cl.
*G01K 1/14* (2021.01)
*G01K 1/024* (2021.01)
*G01M 13/04* (2019.01)
(Continued)

(52) U.S. Cl.
CPC .............. *G01K 1/14* (2013.01); *G01K 1/024* (2013.01); *G01M 13/04* (2013.01); *H01Q 1/48* (2013.01); *H01Q 7/00* (2013.01)

(58) Field of Classification Search
CPC ......... G01K 1/024; G01M 13/04; H01Q 1/48; H01Q 7/00
(Continued)

(56) References Cited

U.S. PATENT DOCUMENTS

| 2016/0056527 A1 | 2/2016 | Pascolini et al. |
| 2016/0149291 A1* | 5/2016 | Park .................... H01Q 1/48 343/702 |

(Continued)

FOREIGN PATENT DOCUMENTS

| CN | 104269609 A | 1/2015 |
| CN | 205120270 U | 3/2016 |

(Continued)

OTHER PUBLICATIONS

International Search Report dated Nov. 2, 2018 of the corresponding International Application PCT/EP2018/072279 filed Aug. 16, 2018.
(Continued)

*Primary Examiner* — Michael G Lee
*Assistant Examiner* — David Tardif
(74) *Attorney, Agent, or Firm* — Norton Rose Fulbright US LLP; Gerard Messina

(57) ABSTRACT

A system includes an essentially metallic body. A sensor device is inserted into a clearance in the metallic body, the sensor device including a sensor unit, an antenna unit, and a ground potential. The antenna unit is electrically connected to the ground potential, which is electrically connected to the metallic body.

10 Claims, 2 Drawing Sheets

(51) Int. Cl.
    *H01Q 1/48*     (2006.01)
    *H01Q 7/00*     (2006.01)

(58) Field of Classification Search
    USPC .......................................................... 374/208
    See application file for complete search history.

(56) References Cited

U.S. PATENT DOCUMENTS

| | | | |
|---|---|---|---|
| 2017/0123531 A1* | 5/2017 | Saul | H01Q 1/48 |
| 2017/0370803 A1* | 12/2017 | Moutsouriz | B65G 43/02 |
| 2018/0174015 A1* | 6/2018 | Destraves | B60C 23/0452 |
| 2020/0130433 A1* | 4/2020 | Stewart | B60C 23/0491 |
| 2020/0182712 A1* | 6/2020 | Kleczewski | B65G 43/08 |
| 2021/0099203 A1* | 4/2021 | Hiemstra | H02J 50/10 |
| 2022/0140469 A1* | 5/2022 | An | H01Q 1/38 |
| | | | 455/73 |

FOREIGN PATENT DOCUMENTS

| | | |
|---|---|---|
| CN | 205122774 U | 3/2016 |
| CN | 105977635 A | 9/2016 |
| CN | 106969790 A | 7/2017 |
| EP | 2833476 A1 | 2/2015 |
| WO | 2014195309 A1 | 12/2014 |

OTHER PUBLICATIONS

Liu Haitao et al. "Electrically Small Loop Antenna Standing on Compact Ground in Wireless Sensor Package" IEEE Antennas and Wireless Propagation Letters, vol. 15, May 6, 2015, pp. 76-79.

* cited by examiner

SYSTEM, COMPRISING A METALLIC BODY AND A SENSOR DEVICE HAVING AN OPTIMIZED ANTENNA UNIT

CROSS-REFERENCE TO RELATED APPLICATIONS

The present application is the national stage of International Pat. App. No. PCT/EP2018/072279 filed Aug. 16, 2018, and claims priority under 35 U.S.C. § 119 to DE 10 2017 216 043.8, filed in the Federal Republic of Germany on Sep. 12, 2017, the content of each of which are incorporated herein by reference in their entireties.

FIELD OF THE INVENTION

The present invention relates to a system having an essentially metallic body that has a clearance. A sensor device is inserted into this clearance, the sensor device including a sensor unit, an antenna unit, and a ground potential. The antenna unit is furthermore electrically connected to the ground potential.

BACKGROUND

Such a system is disclosed for example in published document WO 2014/195309 A1. The latter discloses a circuit board on which a plurality of such sensors are situated at a distance from one another so as to be able to ascertain measured values across the entire length of a roller. For this purpose, the measuring device is inserted into a clearance of the roller body and is injection molded in place. The sensors can be temperature sensors, acceleration sensors, or rate-of-rotation sensors, for example. The temperature sensors make it possible to record temperature values of the roller surface for example. The recorded temperature values can be used for example to monitor the roller bearing or also to infer process parameters in the rolling process. Furthermore, on the basis of measured values recorded by the acceleration sensor and/or rate-of-rotation sensors, it is possible to infer for example an operating state and a running time of the roller or also a bearing state of the roller such as an imbalance for example.

Furthermore, the circuit board has a microprocessor that allows for a wireless communication, for example for a transmission of the measured values. For the wireless communication, the microprocessor therefore has an appropriate antenna unit that is typically connected to a ground potential of the circuit board. The metallic body, however, has a shielding effect on the sensor device, as a result of which the emission of wireless signals by the microprocessor is rendered difficult.

SUMMARY

The present invention relates to a system having an essentially metallic body that has a clearance. A sensor device is inserted into this clearance, the sensor device including a sensor unit, an antenna unit, and a ground potential. The antenna unit is furthermore electrically connected to the ground potential.

The ground potential of the sensor device is electrically connected to the metallic body. It is advantageous in this regard that the electrical connection between the antenna unit and the metallic body via the ground potential of the sensor device is able to increase the antenna efficiency. This is due to the fact that the electromagnetic field lines are better able to separate from the sensor device and the metallic body since they are galvanically connected to each other. The electrical connection between the ground potential of the sensor device and the metallic body is unproblematic with respect to electrostatic discharge since the connection is established to the ground potential of the sensor device and not to an input pin of an active circuit component such as the antenna unit or the sensor unit.

An essentially metallic body is to be understood as a body that is mainly composed of metallic material, but which to a small extent can also include other, nonmetallic components. Thus, the nonmetallic components can represent impurities for example. However, the metallic body can also include plastic parts that are used, e.g., for protecting edges or corners of the metallic body or which make it possible to fulfill other tasks such as a providing a seal with respect to the environment.

An electrical connection is to be understood as a galvanic connection, that is, a metallic connection, between the metallic body and the ground potential.

The clearance can be for example a bore, a blind hole, a depression, or a through-hole.

It is additionally conceivable that the sensor device has further ground potentials that are likewise electrically connected to the antenna unit on the one hand and to the metallic body on the other.

According to an example embodiment of the present invention, an electrically conductive connecting element is situated between the ground potential of the sensor device and the metallic body.

It is advantageous in this regard that this represents a simple possibility of producing an electrical connection between the metallic body and the ground potential of the sensor device. Advantageously, there thus exists a galvanic connection between the metallic body and the ground potential or ground potentials.

In an example embodiment, the electrically conductive connecting element is a spring element, in particular a metallic spring element. It is advantageous in this regard that this allows for a good electrical connection between the metallic body and the ground potential of the sensor device. This is in particular advantageous when the sensor device is inserted into the clearance of the metallic body since the flexibility of the spring element makes it possible to compensate for, e.g., manufacturing tolerances regarding the dimensions of the clearance of the metallic body and/or of the sensor device.

In an example embodiment, the connecting element and the antenna unit are situated near an opening of the clearance and in particular to border on this opening. It is advantageous in this regard on the one hand that the corresponding positioning of the antenna unit keeps the metallic body's shielding effect as low as possible. On the other hand, it is advantageous that this positioning ensures that the electrical connection between the antenna unit and the metallic body via the ground potential of the sensor device is as short as possible. This short path has the consequence that there are no electromagnetic leakage currents and that the radiation of the antenna unit can thus be improved further. Thus, the closer the metallic connection, such as for example the spring element, and the antenna unit are to the surface of the metallic body, the better is the radiation of the antenna unit.

Bordering is to be understood here in the sense that the antenna unit and the connecting element are situated as close as possible to the outer surface of the body, but still inside the clearance, and thus do not protrude from the opening.

The positioning of the system within the clearance makes it possible for example to avoid a collision with the roller bearing.

According to example embodiment, the sensor device and/or the ground potential of the sensor device are designed in such a way that the ground potential is directly electrically connected to the metallic body. It is advantageous in this regard that it is unnecessary for the sensor device to have an additional component for the electrical connection between the ground potential of the sensor device and the metallic body. Since the ground potential of the sensor device typically already exists, only an appropriate embodiment is necessary. This can be made possible for example by a slightly conical circuit board shape, in which there is a direct galvanic contact of the ground surface on the circuit board with the metallic body. This is thus similar to a technique for pressing metal pins into circuit boards.

An example embodiment of the system according to the present invention provides for the antenna unit to be designed as a loop antenna. The loop antenna has proved to be a suitable antenna type for being inserted into a clearance of a body, in which the body has a shielding effect. Loop antennas are available in various forms as SMD-fittable ceramic components. It is advantageous in this regard that a loop antenna can be designed in such a way that it has a radiation pattern that allows for a good radiation out of the clearance shielded by the metallic body. The present invention thus allows for the loop antenna concept to be adapted and optimized for use in clearances of metallic bodies such as for example bore holes.

An example embodiment of the system according to the present invention provides for the sensor device to be surrounded by a housing, the housing having a cutout designed in such a way that the ground potential is electrically connected to the metallic body through this cutout. It is advantageous in this regard that the housing is able to protect the sensor device against external influences. This makes it possible to extend the service life of the sensor device. Through the cutout in the housing, however, it is nevertheless possible to establish the electrical connection between the ground potential of the sensor device and the metallic body, by which the antenna performance can be improved.

In an example embodiment, the sensor unit has a temperature sensor that is thermally connected to the ground potential. It is advantageous in this regard, that the electrical connection between the ground potential of the sensor device and the metallic body typically also represents a good thermal connection. This makes it possible to determine the temperature of the metallic body very accurately using the temperature sensor, and the temperature sensor is able to detect a temperature change of the metallic body promptly.

In an example embodiment, the metallic body is developed as a roller body. It is advantageous in this regard that the roller body can be monitored via the sensor device. For this purpose, in particular a wireless communication via the antenna unit is advantageous since no additional cables are required to transmit measured data for example. These cables would be extremely interfering in particular in the case of a rotating roller.

DETAILED DESCRIPTION

Figure 1:
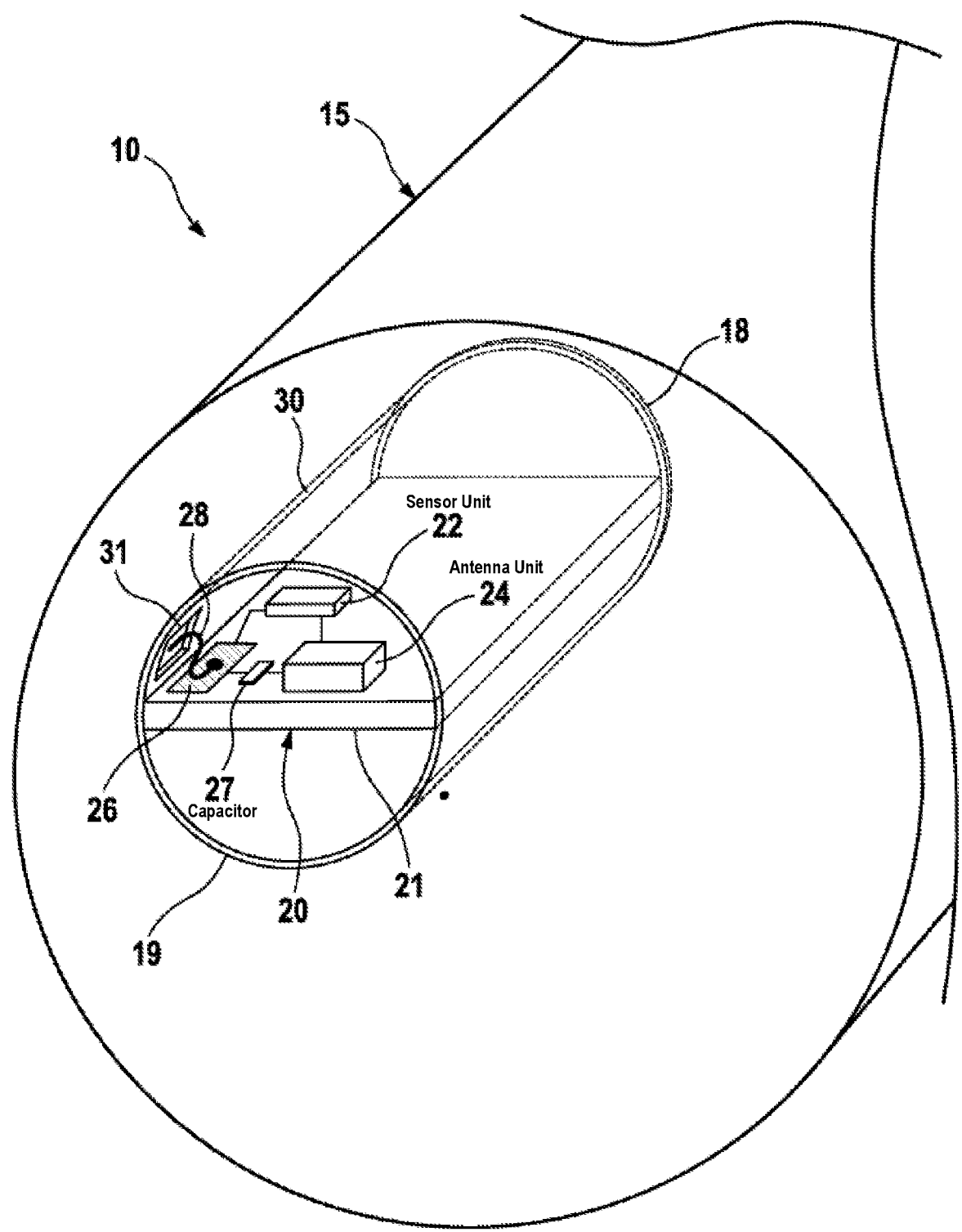
FIG. 1 shows a first example embodiment of a system according to the present invention.

FIG. 1 shows a first example embodiment of a system according to the present invention. A system 10 is shown. System 10 has a metallic body 15. This metallic body 15 can be a roller body for example. Metallic body 15 in turn has a clearance 18. Clearance 18 can be for example a bore in metallic body 15 that is located for example on a front side of the roller body. A sensor device 20, optionally surrounded by a housing 30, is inserted into clearance 18. The sensor device 20 was here inserted into clearance 18 in particular via an opening 19 of clearance 18.

Sensor device 20 has a sensor unit 22, an antenna unit 24, and a ground potential 26. Sensor unit 22, antenna unit 24, and ground potential 26 are situated in particular on a circuit board 21 of sensor device 20. Ground potential 26 is developed as an electrically conductive metal layer on circuit board 21 and is connected both with antenna unit 24 as well as with sensor unit 22. The connection between ground potential 26 and antenna unit 24 is an electrical connection. This connection is established via a capacitor 27. Sensor unit 22 has for example a temperature sensor that is thermally connected to ground potential 26. Sensor unit 22 could additionally or alternatively also have for example an acceleration sensor or a rate-of-rotation sensor, in which a thermal connection to ground potential 26 is accordingly not necessary. Antenna unit 24 is furthermore designed as a loop antenna that makes it possible to set the radiation pattern of antenna unit 24 in such a way that a radiation out of clearance 18 is particularly effectively possible.

The ground potential 26 of sensor device 20 is furthermore connected to the metallic body 15 via an electrically conductive connecting element 28. Connecting element 28 can be designed as a spring element for example. The spring element is designed to be s-shaped. Alternatively, however, a spiral-shaped design of the spring element is also conceivable. The spring element is situated and developed in such a way that it has a press-on force, by which the spring element presses against the surface of clearance 18 that allows for a good electrically and consequently also thermal connection between ground potential 26 and metallic body 15. For this purpose, the spring element is soldered onto the ground potential for example. The closer the connection of the spring element to ground potential 26 is located to the front corner of the circuit board facing the opening, the better it is for the emitted HF signal of antenna unit 24.

If sensor unit 22 has a temperature sensor that is to measure the temperature of metallic body 15, then connecting element 28 in particular should have a material having good thermal conductivity.

In this example embodiment, housing 30 is designed in such a way that it fills clearance 18 completely, that is, in particular, a cross section of housing 30 matches a cross section of clearance 18 and in particular opening 19. Housing 30 furthermore has a cutout 31, through which ground potential 26 is connected to metallic body 15.

Moreover, housing 30 in particular ends flush with the front side of body 15 and thus seals clearance 18 vis-a-vis the outside.

In another example embodiment not shown in the drawing, a closing element can be provided, instead of housing 30 or in addition to housing 30 that closes clearance 18 or opening 19.

Figure 2:
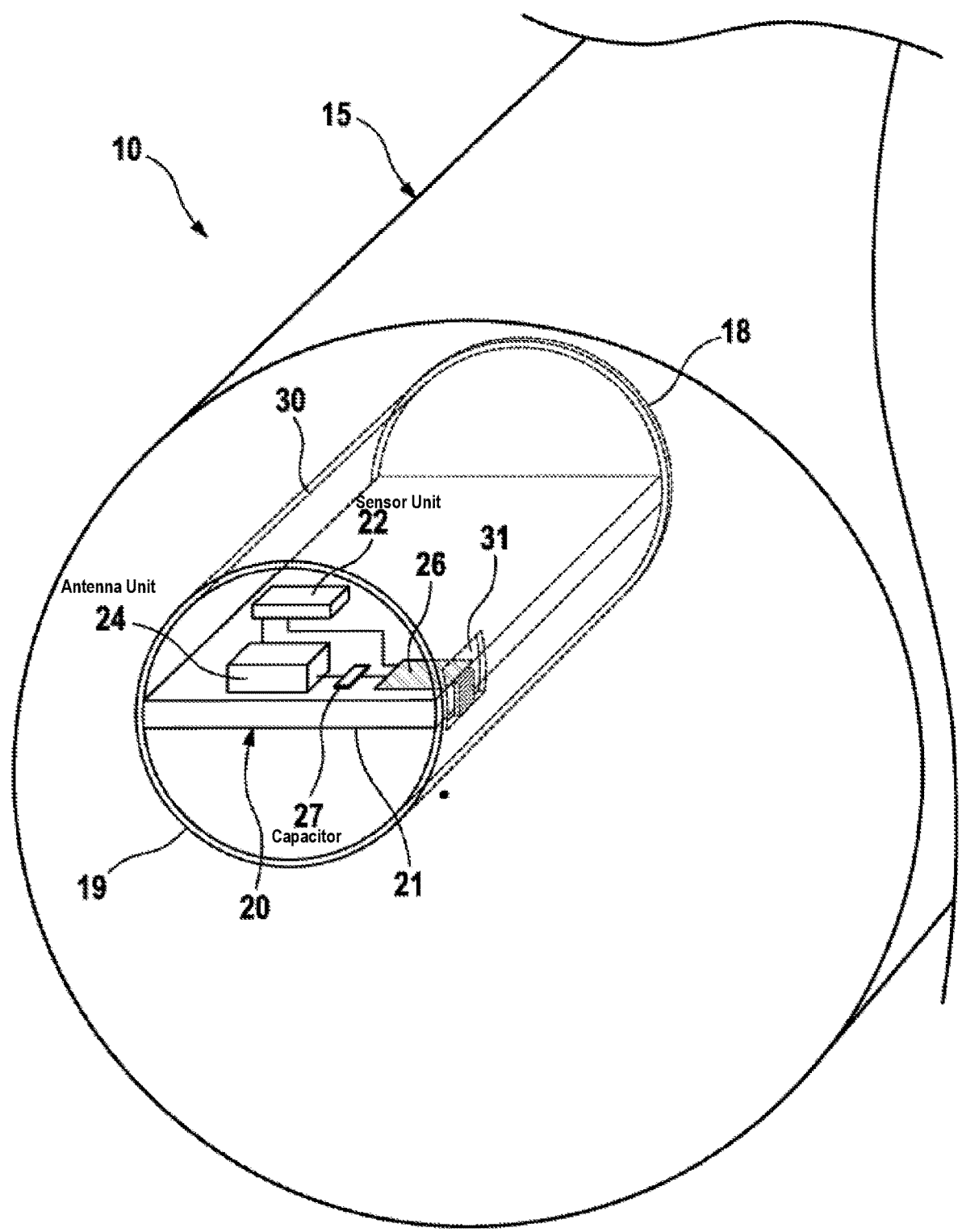
FIG. 2 shows a second example embodiment of a system according to the present invention.

FIG. 2 shows a second example embodiment of a system according to the present invention. FIG. 2 shows a system 11 that is designed in similar fashion as system 10 of the invention depicted in FIG. 1. System 11 differs from system 10 as shown in FIG. 1 only by that no separate electrically conductive connecting element 28 is situated between ground potential 26 and metallic body 15; rather the sensor device 20 and ground potential 26 are developed in such a way that ground potential 26 is directly electrically connected to metallic body 15. For this purpose, a metal layer that forms ground potential 26 is run from the top side of circuit board 21 across its edge to a lateral surface of circuit board 21, from which ground potential 26 is directly connected to metallic body 15. Optional housing 30 has at this connecting point again a corresponding cutout 31.

In another example embodiment not shown in the drawing, circuit board 21 of sensor device 20 can for example have a conical design in such a way that the ground potential 26 situated on the surface of circuit board 21 is directly electrically connected to metallic body 15.

What is claimed is:

1. A device comprising:
an essentially metallic body;
a sensor that is arranged within a clearance of the metallic body and that includes:
 an antenna;
 a ground potential electrically connected to the antenna and to the metallic body; and
 a housing in which the sensor is housed, wherein the ground potential is electrically connected to the metallic body through a cutout in the housing,
wherein a cross section of the housing matches a cross section of the clearance,
wherein the housing completely fills the clearance, and a diameter of the housing equals a diameter of the clearance.

2. The system of claim 1, further comprising an electrically conductive connector situated between the ground potential and the metallic body.

3. The system of claim 2, wherein the electrically conductive connector is a spring.

4. The system of claim 2, wherein the electrically conductive connector is a metallic spring element.

5. The system of claim 2, wherein the connector and the antenna are situated at an opening of the clearance.

6. The system of claim 5, wherein the connector and the antenna are situated so that they border the opening.

7. The system of claim 1, wherein the electrical connection of the ground potential to the metallic body is direct.

8. The system of claim 1, wherein the antenna is a loop antenna.

9. The system of claim 1, wherein the sensor is a temperature sensor that is thermally connected to the ground potential.

10. The system of claim 1, wherein the metallic body is a roller body.

* * * * *